United States Patent
Nath et al.

(10) Patent No.: US 10,789,626 B2
(45) Date of Patent: *Sep. 29, 2020

(54) DEEP-LINKING SYSTEM, METHOD AND COMPUTER PROGRAM PRODUCT FOR ONLINE ADVERTISEMENT AND E-COMMERCE

(71) Applicant: MetaRail, Inc., San Mateo, CA (US)

(72) Inventors: Narendra Nath, Hillsborough, CA (US); Mallikarjun Hiremani, Fremont, CA (US)

(73) Assignee: METARAIL, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,615

(22) Filed: Feb. 1, 2019

(65) Prior Publication Data

US 2019/0164199 A1 May 30, 2019

Related U.S. Application Data

(63) Continuation of application No. 15/463,790, filed on Mar. 20, 2017, now Pat. No. 10,262,342, which is a
(Continued)

(51) Int. Cl.
*G06Q 30/02* (2012.01)
*G06F 16/951* (2019.01)
*G06N 5/04* (2006.01)

(52) U.S. Cl.
CPC ....... *G06Q 30/0277* (2013.01); *G06F 16/951* (2019.01); *G06N 5/04* (2013.01); *G06Q 30/0276* (2013.01)

(58) Field of Classification Search
CPC ............ G06F 16/84–88; G06F 16/951; G06Q 30/0276–0277; G06N 5/04
See application file for complete search history.

(56) References Cited

U.S. PATENT DOCUMENTS 6,490,601 B1 * 12/2002 Markus ............... G06F 21/6245
715/207
6,651,058 B1 11/2003 Sundaresan et al.
(Continued)

FOREIGN PATENT DOCUMENTS

WO    WO0106416       1/2001
WO    WO2006103616    10/2006

OTHER PUBLICATIONS

New advertising technology delivers results for travel marketers: TripAdvisor's contextual links produce response rates 32x better than banner advertising. Dec. 3, 2001. https://tripadvisor.mediaroom.com/ (Year: 2001).*

(Continued)

*Primary Examiner* — Robert D Rines
*Assistant Examiner* — Alissa D Karmis
(74) *Attorney, Agent, or Firm* — Buchalter; Cecily Anne O'Regan

(57) ABSTRACT

Embodiments disclosed herein can leverage dynamic data, fields and implied information from arbitrary web sites, mobile apps and other forms of online media to create a universal variable map and automatically generate deep-linked ads utilizing the universal variable map, linking any arbitrary web site, mobile app, network, Internet TV channel, and other forms of online media to any other such arbitrary web site, mobile app, network, Internet TV channel, and other forms of online media. The automatically generated deep-linked ads can be inserted into any ad server and served out from there in real-time. A deep-linked ad thus presented to a user can take the user from a starting page on one site or application where the ad is displayed directly to a resulting page such as a checkout page on another site or mobile application, with pertinent information already pre-populated, and action already initiated for the user.

10 Claims, 9 Drawing Sheets

Related U.S. Application Data continuation of application No. 13/308,004, filed on Nov. 30, 2011, now Pat. No. 9,633,378.

(60) Provisional application No. 61/420,193, filed on Dec. 6, 2010.

(56) References Cited

U.S. PATENT DOCUMENTS

| | | | |
|---|---|---|---|
| 6,658,623 | B1 | 12/2003 | Schilit |
| 6,662,340 | B2 | 12/2003 | Rawat et al. |
| 6,868,389 | B1 | 3/2005 | Wilkins et al. |
| 7,000,242 | B1 | 2/2006 | Haber |
| 7,080,073 | B1 | 7/2006 | Jiang et al. |
| 7,216,292 | B1 | 5/2007 | Snapper et al. |
| 7,395,259 | B2 | 7/2008 | Bailey et al. |
| 7,409,402 | B1 | 8/2008 | Chan et al. |
| 7,630,986 | B1 | 12/2009 | Herz et al. |
| 7,756,741 | B2 | 7/2010 | Ranka et al. |
| 7,818,208 | B1 | 10/2010 | Veach |
| 8,046,259 | B1 | 10/2011 | Siegel et al. |
| 9,633,378 | B1 | 4/2017 | Nath et al. |
| 10,152,734 | B1 | 12/2018 | Nath et al. |
| 10,262,342 | B2 | 4/2019 | Nath et al. |
| 2001/0037361 | A1 | 11/2001 | Croy |
| 2001/0054046 | A1 | 12/2001 | Mikhailov et al. |
| 2002/0023108 | A1 | 2/2002 | Daswani et al. |
| 2002/0107882 | A1 | 8/2002 | Gorelick et al. |
| 2003/0187667 | A1 | 10/2003 | Azimi |
| 2004/0088713 | A1 | 5/2004 | Myllymaki et al. |
| 2004/0107201 | A1 | 6/2004 | Morris |
| 2004/0243520 | A1 | 12/2004 | Bishop et al. |
| 2005/0125285 | A1 | 6/2005 | McQueeney et al. |
| 2005/0149396 | A1 | 7/2005 | Horowitz et al. |
| 2005/0187818 | A1 | 8/2005 | Zito et al. |
| 2005/0197894 | A1 | 9/2005 | Fairbanks et al. |
| 2005/0209874 | A1 | 9/2005 | Rossini |
| 2005/0240475 | A1 | 10/2005 | Margiloff et al. |
| 2006/0069616 | A1 | 3/2006 | Bau |
| 2006/0212434 | A1 | 9/2006 | Crawford et al. |
| 2006/0277102 | A1 | 12/2006 | Agliozzo |
| 2007/0022096 | A1 | 1/2007 | Hertz |
| 2007/0061199 | A1 | 3/2007 | Montgomery et al. |
| 2007/0067215 | A1 | 3/2007 | Agarwal et al. |
| 2007/0088609 | A1 | 4/2007 | Reller et al. |
| 2007/0226206 | A1 | 9/2007 | Pavlovski et al. |
| 2007/0233565 | A1 | 10/2007 | Herzog et al. |
| 2007/0239494 | A1 | 10/2007 | Stephens et al. |
| 2007/0239527 | A1 | 10/2007 | Nazer et al. |
| 2007/0239542 | A1 | 10/2007 | Shapiro |
| 2007/0244750 | A1 | 10/2007 | Grannan et al. |
| 2007/0250520 | A1 | 10/2007 | Dettinger et al. |
| 2007/0256005 | A1 | 11/2007 | Schneider et al. |
| 2008/0010142 | A1 | 1/2008 | O'Brien et al. |
| 2008/0046313 | A1 | 2/2008 | Chen |
| 2008/0086356 | A1 | 4/2008 | Glassman et al. |
| 2008/0103897 | A1 | 5/2008 | Flake et al. |
| 2008/0140508 | A1 | 6/2008 | Anand et al. |
| 2008/0201188 | A1 | 8/2008 | Heyman et al. |
| 2008/0255915 | A1 | 10/2008 | Collins et al. |
| 2008/0294524 | A1 | 11/2008 | Badros et al. |
| 2008/0301562 | A1 | 12/2008 | Berger et al. |
| 2009/0012903 | A1 | 1/2009 | Subramanian et al. |
| 2009/0024718 | A1 | 1/2009 | Anagnostopoulos et al. |
| 2009/0055354 | A1 | 2/2009 | Arad |
| 2009/0077022 | A1 | 3/2009 | Cuthbert |
| 2009/0112656 | A1 | 4/2009 | Jung et al. |
| 2009/0119169 | A1 | 5/2009 | Chandratillake et al. |
| 2009/0119173 | A1 | 5/2009 | Parsons et al. |
| 2009/0144124 | A1 | 6/2009 | Surendran et al. |
| 2009/0164581 | A1 | 6/2009 | Bove et al. |
| 2009/0240586 | A1 | 9/2009 | Ramer et al. |
| 2009/0313127 | A1 | 12/2009 | Chaiken et al. |
| 2010/0082439 | A9 | 4/2010 | Patel et al. |
| 2010/0082778 | A1 | 4/2010 | Muilenburg et al. |
| 2010/0094758 | A1 | 4/2010 | Chamberlain et al. |
| 2010/0121706 | A1 | 5/2010 | Arena et al. |
| 2010/0145762 | A1 | 6/2010 | Coladonato et al. |
| 2010/0228623 | A1 | 9/2010 | Devaraj et al. |
| 2010/0235220 | A1 | 9/2010 | Guha et al. |
| 2010/0241511 | A1 | 9/2010 | Cunningham et al. |
| 2010/0293063 | A1 | 11/2010 | Atherton et al. |
| 2011/0099077 | A1 | 4/2011 | Darin et al. |
| 2011/0213655 | A1 | 9/2011 | Henkin et al. |
| 2012/0123859 | A1 | 5/2012 | Gupta |
| 2012/0144281 | A1* | 6/2012 | Schechter ............ G06F 16/9535 715/205 |
| 2014/0100997 | A1 | 4/2014 | Mayerle et al. |
| 2015/0186931 | A1 | 7/2015 | Flake |
| 2017/0185596 | A1 | 6/2017 | Spirer |
| 2017/0228797 | A1 | 8/2017 | Nath et al. |
| 2017/0308939 | A1 | 10/2017 | Krishnan et al. |
| 2018/0025085 | A1 | 1/2018 | Sarangi et al. |
| 2019/0164199 | A1 | 5/2019 | Nath et al. |

OTHER PUBLICATIONS

Office Action issued for U.S. Appl. No. 13/308,004, dated Dec. 18, 2013, 14 pages.

Office Action issued for U.S. Appl. No. 13/308,004, dated Jul. 2, 2014, 13 pages.

Office Action issued for U.S. Appl. No. 13/308,004, dated Jun. 26, 2015, 22 pages.

Office Action issued for U.S. Appl. No. 13/308,004, dated Sep. 6, 2016, 13 pages.

"New Advertising Technologies Delivers Results for Travel Marketers: TripAdvisors Bettern Athan Banner Advertising," Dec. 3, 2011, [Retrieved from <<https://tripadvisor.com/PressCenter-i2369-cl-Press_Press_Releases.html>>], 2 pages.

Notice of Allowance issued for U.S. Appl. No. 13/308,004, dated Mar. 8, 2017, 22 pages.

Myllymaki, "Effective Web Data Extraction with Standard XML Technologies," Computer Networks 39 (2002) 635-644.

Office Action issued for U.S. Appl. No. 15/463,790, dated Oct. 11, 2017, 10 pages.

Notice of Allowance issued for U.S. Appl. No. 15/463,790, dated Jun. 4, 2018, 11 pages.

Aaron Rubin, Are You Experienced—The Copyright Implications of Web Site Modification Technology, 89 Calif. L. Rev. 817 (2001), 34 pages.

Office Action issued for U.S. Appl. No. 15/725,138, dated Apr. 16, 2018, 10 pages.

Notice of Allowance for U.S. Appl. No. 15/463,790, dated Oct. 3, 2018, 7 pages.

Eastlake, D., Electronic Commerce Modeling Language (ECML) Version 2 Specification, Jun. 2005 www.rfc-base.org, 34 pages.

Notice of Allowance for U.S. Appl. No. 15/725,138, dated Oct. 5, 2018, 10 pages.

Notice of Allowance issued for U.S. Appl. No. 15/463,790, dated Jan. 17, 2019, 11 pages.

Office Action issued for U.S. Appl. No. 15/672,905, dated Feb. 18, 2020, 21 pages.

Office Action issued for U.S. Appl. No. 15/678,765, dated Feb. 18, 2020, 11 pages.

Office Action issued for U.S. Appl. No. 15/687,831, dated Feb. 19, 2020, 12 pages.

Office Action issued for U.S. Appl. No. 15/706,002, dated Feb. 19, 2020, 11 pages.

Office Action issued for U.S. Appl. No. 15/724,022, dated Feb. 19, 2020, 18 pages.

Office Action issued for U.S. Appl. No. 15/789,164, dated Feb. 19, 2020, 12 pages.

* cited by examiner

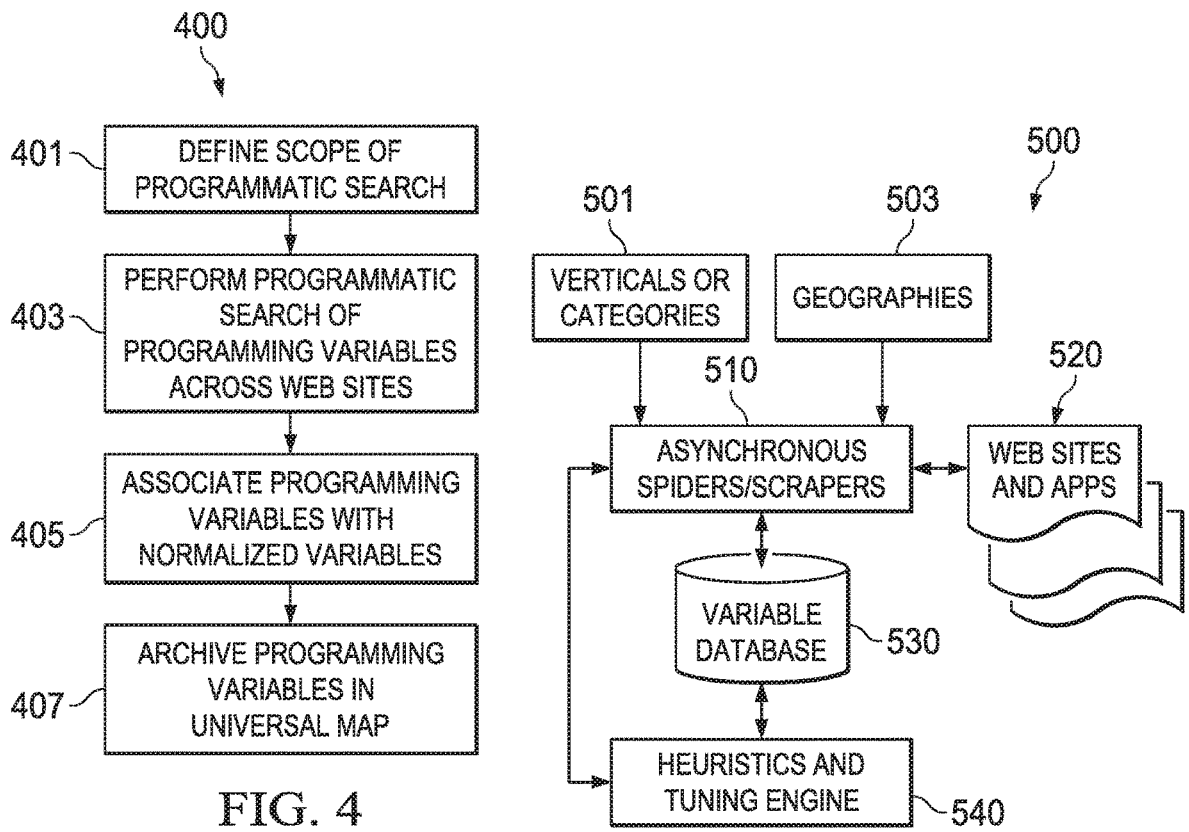
FIG. 4
FIG. 5
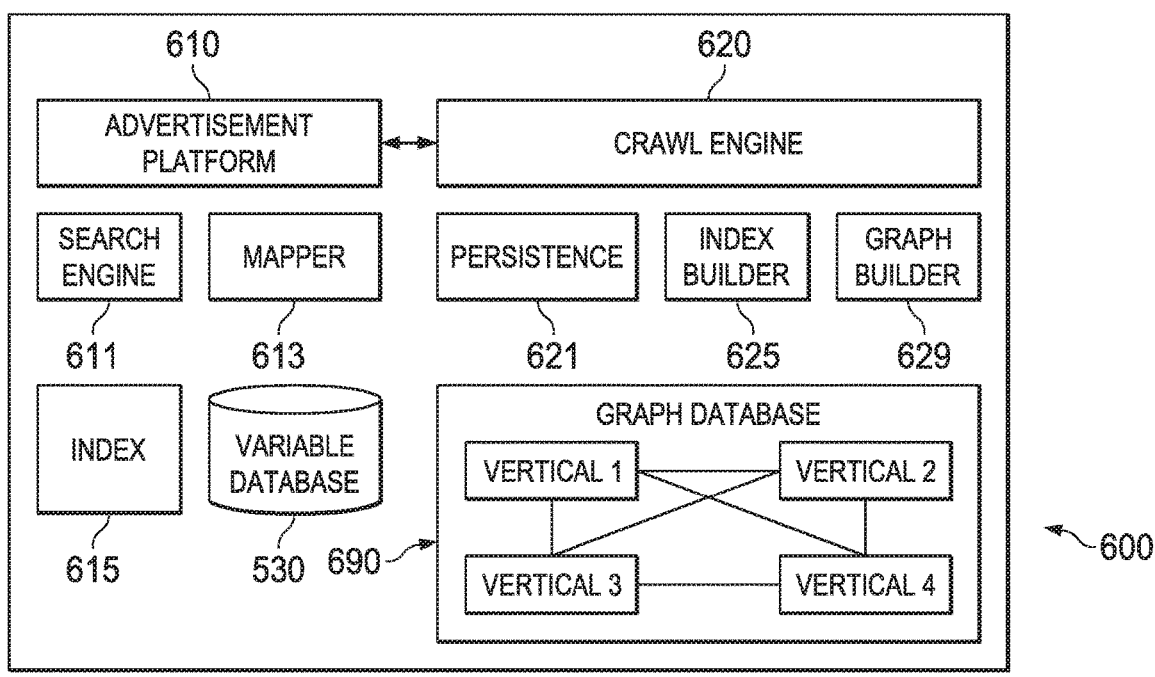
FIG. 6

DEEP-LINKING SYSTEM, METHOD AND COMPUTER PROGRAM PRODUCT FOR ONLINE ADVERTISEMENT AND E-COMMERCE

CROSS-REFERENCE TO RELATED APPLICATIONS

This application is a continuation of, and claims a benefit of priority under 35 U.S.C. § 120 to U.S. patent application Ser. No. 15/463,790, filed Mar. 20, 2017, entitled "DEEP-LINKING SYSTEM, METHOD AND COMPUTER PROGRAM PRODUCT FOR ONLINE ADVERTISEMENT AND E-COMMERCE," which is a continuation of, and claims a benefit of priority under 35 U.S.C. § 120 to U.S. patent application Ser. No. 13/308,004, filed Nov. 30, 2011, now U.S. Pat. No. 9,633,378, entitled "DEEP-LINKING SYSTEM, METHOD AND COMPUTER PROGRAM PRODUCT FOR ONLINE ADVERTISEMENT AND E-COMMERCE," which is a conversion of, and claims a benefit of priority from U.S. Provisional Application No. 61/420,193, filed Dec. 6, 2010, entitled "SYSTEM, METHOD, DATABASE AND SOFTWARE PROGRAM FOR AUTOMATING THE SPIDERING, ARCHIVING AND PROGRAMMATIC USE OF DYNAMIC DATA from arbitrary web sites, MOBILE APPS AND OTHER FORMS OF ONLINE MEDIA," all of which are fully incorporated herein by reference for all purposes.

TECHNICAL FIELD

This disclosure relates generally to the field of online advertising and E-commerce. More particularly, embodiments disclosed herein relate to deep-linked advertising and E-commerce. Even more particularly, embodiments disclosed herein relate to a deep-linking system, method, database, and computer program product for online ads and E-commerce widgets, the online ads and widgets being automatically generated utilizing dynamic data from arbitrary web sites, mobile apps and other forms of online media and being able to automatically transfer their dynamic data to other arbitrary web sites, mobile apps and other forms of online media, thereby pre-populating fields on the receiving online media, or enabling ad clicks to land directly on a results page or checkout page rather than a home page, substantially increasing conversion rates and performance. Note that the definition of this dynamic data includes data explicitly typed in by the user, as well as data that may be implicitly inferred from the page that the user is on, and the page location s/he clicks on or hovers over. Note further that dynamic data may be obtained at the initiative of the advertising system via a "pull" model, or at the initiative of the sites and applications being linked to via a "push" model.

BACKGROUND OF THE RELATED ART

The advertising industry is seeing substantial developments and transformations around the world. In particular, a greater percentage of overall worldwide marketing spending is shifting from traditional offline media such as print, television, billboards and venues to online media such as the Internet, mobile apps, Internet access networks, Internet television, etc. This is happening for two primary reasons—firstly, a greater percentage of consumer "eyeballs" are shifting from offline to online media. Secondly, the online media affords much greater ability to measure and manage advertising programs and placements, such that advertisers are able to get greater return on investment, and engage in more performance-based marketing practices. Digital advertising, as the various forms of online or interactive advertising are commonly described, is thus becoming an increasing percentage of the overall advertising market. With this trend, the requirement to provide better and better targeting, relevance and harmony with content continues to get stronger in order to provide greater value to end-users, better return-on-investment for advertisers, and better site loyalty and monetization for publishers.

Within Digital Advertising, the two largest categories currently are Display Advertising and Search Advertising. Display advertising refers to any type of banner ads, audio ads, video ads, animation ads, etc. where the ad unit (a piece or an item of advertising) is presented on the publisher media based on some filtering conditions specified by the advertiser or the publisher. These filtering conditions might include current information, such as the location of the user, the date and time of the ad serving, as well as historical information, such as the sites the user has been on prior to coming to this publisher's media, the user's past click and purchase behavior on this and other media, etc. Advertisers and publishers are finding that the better the targeting of an ad, the better its performance for all parties.

Search advertising refers to a major innovation brought about by Google™ Bing™ and other "horizontal" search engines. These horizontal search engines came up with new and better ways to sort and categorize the entire Internet by keywords, or groups of words typed in by users to find information they were interested in. The search engines were so effective for users that they quickly became the dominant entry points for users looking to get on the Internet. Google and other search sites then introduced a major innovation in the world of advertising, and that was to use the keywords typed in by users searching for information to select the ads to present. Subsequently, they also added the ability to serve up ads filtered out by the static content of any web site, not just Google or Bing itself. Furthermore, they changed ad formats from predominantly banner based to predominantly text based, as a further message to users about relevance and contextualization, rather than intrusiveness of display. By enhancing the contextualization and presentation of ads, the search engines were able to greatly shift advertising spend from offline and display ads to search ads.

Advances in information technology, and business requirements for continually better performance continue to bring changes and challenges to online advertising. Consequently, there is always room for improvement and innovation.

SUMMARY OF THE DISCLOSURE

A recent advancement in Digital Advertising has been "deep-linked" or "parameter-based" advertising. This form of advertising today applies to search and E-commerce sites where the user is searching for a product or service, like a travel site, and types in search parameters, such as where s/he is traveling from, where to, travel dates, how many people in the party, class of travel, etc. These search parameters are then passed along with each ad click to the appropriate advertiser. The advertiser then uses the parameters passed along to: (a) hyper-target the placement of ads and customize the copy of ads presented on targeted web pages, and (b) automatically activate searches from their home page, thereby landing the web user "deep" into their booking process rather than on their home page as is customary with other forms of ad clicks.

Targeting and customizing the ad copy dynamically results in much greater click-through rates, and landing the ad click deep in the booking process results in much greater conversion rates. As a result, deep-linked ads have much higher overall return-on-investment for advertisers, translating to much higher monetization rates for publishers.

To make deep-linked ads work, dynamic data from the publisher's site or app needs to be input into the appropriate locations on the advertiser's site or app, enabling it to "fast-forward" the user click deep into its conversion funnel. In one embodiment of this invention, to make these ads work fields or variables on the publisher site or mobile app need to be mapped and integrated with corresponding fields or variables on the advertiser site or mobile apps, and the ad click sent to the appropriate dynamic page URL as opposed to the home page URL. So far in the industry, these deep-linked ad connections have been manually created by developing programmatic integrations between variables and fields on the publisher web site and the advertiser web site, created by manual code. This is so because each web site uses its own field descriptors and variable names, and the only way to create deep-linked ads has been to manually obtain the names of the respective variables from both publishers and advertisers and then integrate them to each other through manual programming.

This manual programming is a time and resource intensive activity that multiplies as the size of the network grows, limiting the size, scale and market adoption for deep-linked ads. Furthermore, this manual model requires prior knowledge of ads to be placed on a given publisher's site or app in order for the deep-linked integrations to be pre-built. However, this then precludes many of the traditional efficiencies in the Display and Search ad markets, such as an open real-time bidding model for ad inventory, flexibility of placing ads and pulling them down on demand, dynamic targeting, etc. There is hence an acute need for an automated way to generate deep-linked ads, as that will spur rapid and much wider adoption of these kinds of ads by increasing numbers of participating web sites and by bringing new market efficiencies to both publishers and advertisers and thereby produce greater economic gains for a larger cross-section of publisher and advertiser sites. These benefits accrue whether the automated ad generation system is operated by human beings at the network acting upon requests made by publishers or advertisers, as well as by self-help systems that can be directly used by human operators at publishers and advertisers.

Embodiments disclosed herein provide various solutions for automating the spidering or otherwise data gathering, archiving, inferring, linking and programmatic use of dynamic data and the programming containers or variables for this dynamic data from arbitrary web sites (also referred to herein as "sites"), mobile apps and other forms of online media to other arbitrary web sites, mobile apps and other forms of online media. Note that this dynamic data may comprise data explicitly typed in by the user, as well as data implicitly inferred from the page that the user is on, and/or the page location s/he clicks on or hovers over. More specifically, some embodiments disclosed herein may enable the automated generation of deep-linked ads between any arbitrary web site, mobile app, private Internet network, Internet TV channel, and other forms of online media and any other such arbitrary web site, mobile app, private Internet network, Internet TV channel, and other forms of online media. Some embodiments may additionally enable the automatically generated deep-linked ads to be inserted into any ad server, such that the deep-linked ads can be served out from there in real-time. Some embodiments may also enable deep-linked ads to be created in real-time by fetching non deep-linked Display or Search ads from real-time ad exchanges or other sources, appending deep-linking codes into the fetched ads, and then placing the deep-linked versions of these ads back out onto real-time ad exchanges or other ad servers. Some embodiments may enable the deep-linked ads to land the user directly onto the results or checkout page of the advertising site or application, other embodiments may enable the pre-population of dynamic data into the forms of the advertising site or application but not activating the actual search action, in the event that all fields cannot be pre-populated because of incomplete dynamic data being passed from the publishing site. Deep-linked ads in this embodiment reduce data entry required of users by pre-populating what is already available from the publishing site, thereby increasing conversion rates.

In some embodiments, a method of automated generation of deep-linked ads may comprise some or all of the following:

- Create a list of all the verticals and all the geographies in which an ad company wishes to operate.
- Generate lists of web sites belonging in the above verticals and geographies by doing a search on Google, Bing and other search and directory resources.
- Run asynchronous spiders over the Internet, or otherwise gather information pushed directly from sites and web pages, to verify the verticals and product categories to which sites and web pages belong and capture and continually update the names of all the site categories and variables or field identifiers or containers of user input data on all sites and apps reached based on the lists.
- Normalize all the variables and identifiers to a meta-schema constructed for each vertical and type of site or app, whereby all variables and identifiers are mapped to their standard normalized names.
- Create mini-integrations or handshakes between each gathered variable and the corresponding normalized variable by employing a series of mapping heuristics that can be fine-tuned over time. In one embodiment, this is realized via a universal variable map. For efficiency purposes, many or all mini-integrations can also be performed directly between publisher and advertiser of ad, rather than each to the normalized variables as an interim step. The mini-integrations can be created at any stage—during the time the variables are first gathered, when an ad placement is created, just as an ad is about to get served in real-time, or any other time in the process.
- Spidering or otherwise gathering the dynamic landing page URL to which to send the ad click, as opposed to a static home page or other landing page URL.
- Run processes to continually validate, update and fine-tune the data gathering, spidering and variable mapping process. These processes may be adaptive and/or involve human oversight.
- Either as an asynchronous batch process, or as a synchronous process when requested by a publisher or advertiser wanting to place deep-linked ads, generate a deep link ad with the appropriate integrations between publisher variables and advertiser variables already built in.
- Determine the positioning of each deep-linked ad placement relative to other deep-linked or non-deep-linked ad placements based on the bid prices of the various ads, click-through rates of the various ads, CPM rates of the various ads, eCPM rates of the various ads, any combination of the above, or any other bid or performance characteristics.

In one embodiment, the user input field on a publisher site might comprise a composite field, such as a multi-keyword text string. In this embodiment, the composite text string can be parsed into its component values that can then be passed into the corresponding normalized variables through a real-time parsing module. These normalized variables can then be linked to explicit variables on the advertising site, thereby passing all requisite dynamic data from a composite multi-keyword text field on the publisher site into the right multiple fields in the right locations on the advertiser site.

In another embodiment, the user might not fill out any field on the publisher site if this is a browse-based site. In this situation, the user's click on any page, or a hover over a location on a page, can be used to define what item or link or attribute the user clicked on or hovered over, and on which page of the publisher site, using that information to set the inferred values into the corresponding normalized variables in the universal variable map in real-time. These normalized variables can then be linked to explicit variables on the advertising site, thereby passing all requisite dynamic data from the page location clicked on or hovered over into the right locations on the advertiser site.

In some embodiments, through the universal variable map, forms and fields from one site can be associated with one or more relevant forms and fields from one or more different sites, even if the sites themselves may be in different verticals. Leveraging this unique and comprehensive universal variable map, embodiments can take a web site visitor from an initial stop (e.g., a home page of a first web site) directly and in real-time through a specific deep-link ad to a landing spot on another site (e.g., a checkout page of a second web site), or to a home page on another site with as much data pre-populated as available based on the user's input in the context of the particular E-commerce transaction.

In one embodiment, deep-linked ads can be daisy-chained, whereby upon receiving an ad click from a publisher site, the advertiser site can in turn become the next publisher site, sending a deep-linked ad click to its own advertiser site, with the sequence proliferating indefinitely. There is hence an indefinite number of cascading deep-linked ads that can be set up, each ad having the ability to leverage all of the user input—explicitly typed in, or implicitly inferred from the user's clicks or hovers—up to that point.

Some embodiments disclosed herein may provide a computer program product having at least one non-transitory computer readable medium storing instructions translatable by at least one processor to implement the direct deep-linking methodology disclosed herein, including the automated generation of deep-linked ads. Some embodiments disclosed herein may provide a system comprising at least one processor and at least one non-transitory computer readable medium storing instructions translatable by the at least one processor to implement the deep-linking methodology disclosed herein, including the automated generation of deep-linked ads.

With embodiments disclosed herein, publisher sites, apps and media can leverage deep-linked ads with the same ease as Display ads and Search ads, dramatically enhancing their revenue and monetization. At the same time, advertisers can place deep-linked ads on a full range of online media, dramatically enhancing their conversion rates and return on investment.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 4 depicts a diagrammatic representation of an example process flow and modules implementing an embodiment of a method disclosed herein;

FIG. 5 depicts a diagrammatic representation of an example embodiment utilizing keyword density of meta tags for selection of an appropriate schema in the automated generation of deep-linked ads, and using a set of smart heuristics to match variables on one site or mobile app to those on another site or mobile app;

FIG. 6 depicts a diagrammatic representation of an example embodiment for processing product information gleaned from web sites to map to the universal schema and map all related relationships;

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
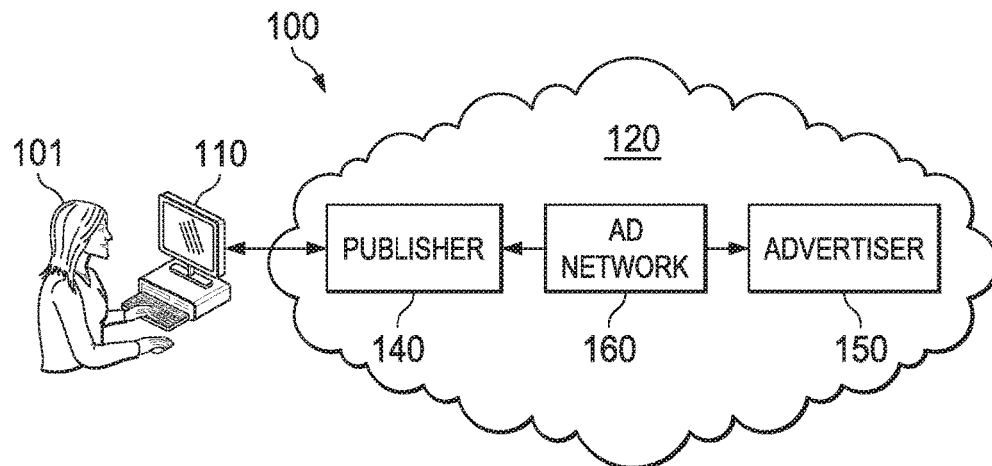
FIG. 1 depicts a diagrammatic representation of an example network architecture in which embodiments disclosed herein may be implemented.

FIG. 1 depicts a diagrammatic representation of a high-level network architecture 100 in which embodiments disclosed herein may be implemented. In the example of FIG. 1, user 101 at user device 110 may direct a browser application running on device 110 to a particular Internet Protocol (IP) address of publisher site 140 on Internet 120. Depending upon user input, publisher site 140 may present a product or service search page containing various links to user 101. This product or service search page may contain one or more links to advertiser 150. Publisher 140 and Advertiser 150 may be clients of ad network 160. If user 101 views or clicks on an ad published by publisher 140, advertiser 150 may pay publisher for that view or click.

Figure 2:
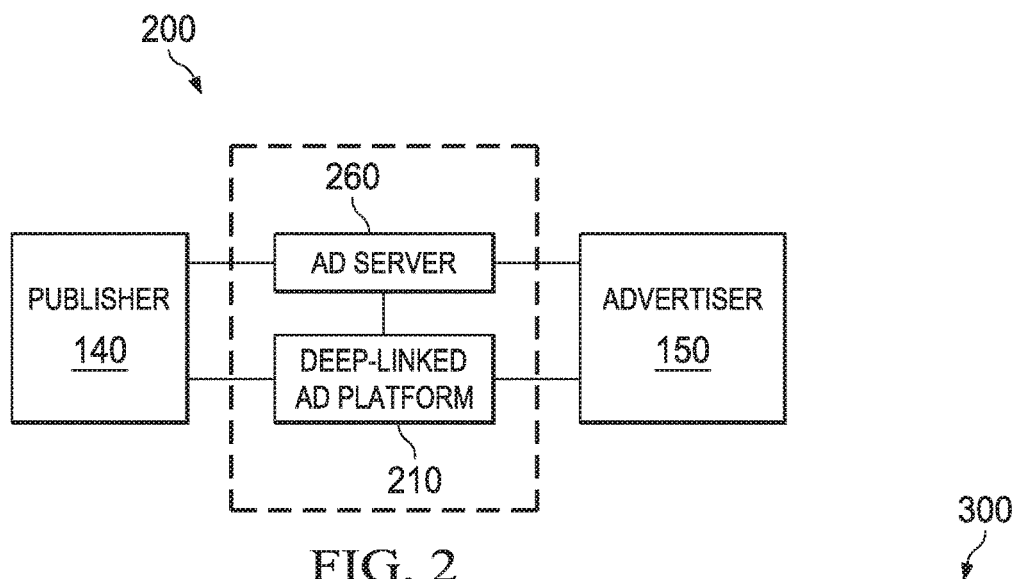
FIG. 2 depicts a diagrammatic representation of an example system architecture according to some embodiments disclosed herein.

FIG. 2 depicts a diagrammatic representation of example system architecture 200 according to some embodiments disclosed herein. In the above example, ad network 160 may include ad server 260. Ads for advertiser 150 may be prepared and/or served by ad server 260 to publisher 140. In one embodiment, platform or system 210 (also referred to herein as an Ad system) may reside on or alongside Ad server 260 and operate to automatically generate deep-linked ads for advertiser 150 and published by publisher 140 on web sites. In one embodiment, Ad system 210 may be implemented on a single server computer or on a cluster/farm of servers, which may include any combination of separate server computers and may provide automatically generated deep-link ads to ad server 260. An example of a suitable server computer may include a central processing unit (CPU), read-only memory (ROM), random access memory (RAM), hard drive (HD) or non-volatile memory, and input/output (I/O) device(s). An I/O device may be a keyboard, monitor, printer, electronic pointing device (e.g., mouse, trackball, etc.), or the like.

Embodiments may include a computer program product implementing a deep-linking method for online ads, the deep-linked ads being automatically generated on Ad system 210. As one skilled in the art can appreciate, a computer program product implementing the method disclosed herein may comprise one or more non-transitory computer readable storage media storing computer instructions translatable by one or more processors in Ad system 210. Examples of computer readable media may include, but are not limited to, volatile and non-volatile computer memories and storage devices such as ROM, RAM, HD, direct access storage device arrays, magnetic tapes, floppy diskettes, optical storage devices, etc.

Figure 3:
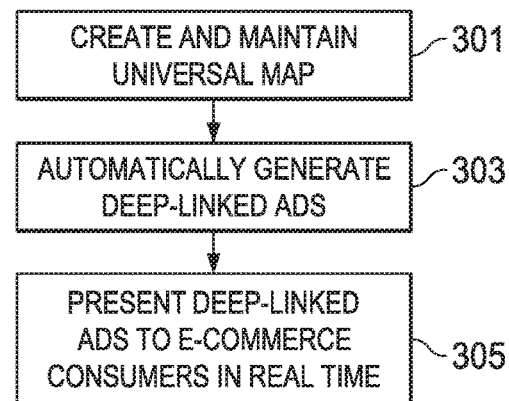
FIG. 3 depicts a flow diagram representing an example embodiment of a method of creating a universal variable map for deep-linking.

FIG. 3 depicts a flow diagram representing an example embodiment of a deep-linking method disclosed herein. In this example, method 300 may comprise creating and maintaining a universal map of variables and identifiers from sites (step 301), automatically generating deep-linked ads from the variables and identifiers and other data in the universal variable map (step 303), and presenting deep-linked ads to consumers in real time (step 305). These steps will be further described below.

FIG. 4 depicts a flow diagram representing an example embodiment of a method for creating and maintaining a universal variable map. In this example, method 400 may comprise defining a scope of a programmatic search (step 401). For example, an operator of Ad system 210 may define verticals and categories of sites to be searched on the Internet. This list can be a typed-in list, flat file list, excel file list, or any form of entry suitable for input to one or more modules for data gathering or spidering or scraping. An example of list entries for verticals can be Travel, Real Estate, Cars, Jobs, etc. An example of list entries for geographies can be zip code, phone area code, geo-coordinates, or names like California, Texas, China, India, South America, etc.

In some embodiments, sites might submit or "push" their variable data, or actual product or services data along with associated data schemas from their private databases to the ad system. In these embodiments, the ad system can map explicit variables to other linked sites via the universal variable map, or can infer variable names from data and schemas provided by participating sites, and map them to other linked sites via the universal variable map, thereby providing deep-linking benefits even if one of the linked sites submits its data to the ad system directly, rather than via spidering over the Internet.

In some embodiments, method 400 may further comprise performing a programmatic search for the verticals and geographies defined in the list via various horizontal search engines (step 403). Each site on the list may then receive from the site, or be crawled to see if a vertical or horizontal search box (form) is found. If no search box is found, then all the site's page headers or site map may be extracted and saved in Ad system 210. The page headers or site map may be used to identify values for normalized variables should a user click on or hover over an identified location on the appropriate pages. If search boxes can be found, as illustrated in FIG. 5, one or more asynchronous spiders/scrapers or data gathering interfaces 510 may be utilized to interact with a plurality of web sites and applications 520 to obtain the desired information about lists of qualifying web sites, and the variables or identifiers on them. Example search engines may include Google, Bing, and any other horizontal search engines desired. In some embodiments, spiders/scrapers or data gathering interfaces 510 may comprise software modules programmed to utilize a suite of heuristics to begin identifying sites and fields around verticals 501 and geographies 503 defined in the list(s). For instance, if a vertical name specified is Travel, a spidering module may search for "Travel sites," "Travel apps," "Traveling sites," "Traveling apps," "Travel web sites," "Travel Web Sites," and any combination or variation of the above it decides to use. As an example, the spidering module may look up the first 100, 200, 1000, or however many web sites it wants to do the keyword searches for.

In some embodiments, spidering module or data gathering module 510 may then scan all the search engine optimization (SEO) tags specified on each of web sites and applications 520 to categorize what kind of site it is. As an example, SEO tags may specify a site as a Travel agency site, a Travel meta-search site, a Travel comparison site, a Travel content and blog site, etc.

In some embodiments, spidering module or data gathering module 510 may look up the Form section of each relevant web page, parse out the names of all the variables or input field identifiers (step 405), and archive them in a database which can be considered a universal variable map to all relevant forms and fields across the web sites crawled by the spidering module or data gathering module thus far (step 407). If the Form found by spidering module or data gathering module 510 consists of a single text string field, the spidering module or data gathering module may tag the field as such in the universal variable map, thereby triggering a real-time parser to be executed to parse out the text string, decompose it into values for each of the specified variable fields for the appropriate Vertical schema, and set the right values into the right variables based on the vertical and product category the form belongs to. For example, if the text string typed in by a user into a text string field is "Flights from San Francisco to London", the real-time parser may decompose the text string to mean that Vertical=Travel/Flights, Origin=San Francisco, Destination=London and set the appropriate variables accordingly as the ad is being served. In contrast, if the form found by spidering module or data gathering module 510 includes multiple fields, the spidering module or data gathering module collects the names of variables and identifiers used for input fields on web sites. In other words, in the context of embodiments disclosed herein, spidering or crawling web sites, or direct data gathering from data provided by web sites, can be utilized to crawl and parse names of programming variables as opposed to static content on pages. These names are essentially the place holders for dynamic data that a user types in on a site, or clicks on or hovers over on a site, and can be passed between publisher and advertiser web sites.

For instance, following the above example, the spidering module can go to a Travel web site, crawl the page, parse the Form section of the page and determine, for example, that the "from" field for a flight is called "Orig" and the "to" field is called "Dest", that the date fields are called "DepDate" and "ArrDate", that the time fields are called "DepTime" and "ArrTime", etc. The names of all such variables are then archived in a universal variable map, one example of which is implemented as variable database 530 shown in FIG. 5. Variable database 530 can be suitably configured for storing normalized programming variables and data associated therewith.

A non-limiting example of one embodiment of a universal variable map is illustrated below in Table 1.

| Web Sites | xxx.com | yyy.net | zzz.org | ... | Normalized Variables |
|---|---|---|---|---|---|
| Variable 1 | Orig | Depart_City | From | ... | from |
| Variable 2 | Dest | Arrival_City | To | ... | to |
| Variable 3 | ... | ... | ... | ... | ... |
| ... | ... | ... | ... | ... | ... |

In addition to spidering or data gathering the names of variables as identified above, the spidering module or data gathering module can also note the landing page URL of the dynamic results page by looking at the "Action" meta-tag of the form being scanned. This URL can then be used to land the ad click deep into the results or checkout page, rather than on a static home page or other landing page.

In some cases, a page may be coded up in Ajax code. In one embodiment, the method may further comprise running a programmatic query on the page coded in Ajax, receiving a dummy response page, and performing the parsing and scanning on the response page to obtain all the variable names. One embodiment of the spidering module or data gathering module described above may be further configured to perform these steps. As illustrated by this embodiment, the spidering module or data gathering module disclosed herein can gather and parse variable names from all kinds of pages available.

Some web sites may not have any form, search box, variable and/or parameter associated with them. Such web sites may contain index or browse-based navigation. Examples of such web sites may include Sears.com or BestBuy.com. In some embodiments, the spidering module or data gathering module 510 may be programmed to spider these web sites. More specifically, the spidering module or data gathering module may spider the site maps of these sites, or the page headers and navigation field tags and thereby have the intelligence to detect whatever implicit parameters are relevant from the location of a user click or user hovering exercise, such as location of the user, time and date of parsing, item clicked on, category clicked on, etc. For instance, if the user is on the Laptop page of the Amazon.com site, the page header and navigation field tags indicate that this is a Laptop purchase page. This defines the vertical (Electronics) and product (Laptop) of the site. Furthermore, the page has several attribute selections (Brand, Budget, Screen Size, etc.) and values on the navigation of the page. Each attribute represents a variable in the universal variable map, and each selection the possible values for that variable. Each time the user clicks on a navigation option, or hovers over it, the appropriate variable can be set with the appropriate value in the ad click.

FIG. 6 depicts a functional diagram showing example system components implementing an embodiment disclosed herein. In this example, Ad system 600 may implement one embodiment of Ad system 210 and may comprise advertisement platform 610 and spidering engine or data gathering module 510 or crawl engine 620.

In one embodiment, crawl engine 620 may use search engine 611 to find sites that belong to the vertical being spidered, and build a graph database 690 of verticals and sub-verticals to an arbitrary level of granularity using graph builder 629. This graph database may be used to track associations between forms and fields on one site or app and another site of app, whether in the same vertical or in different verticals. When sites and applications are linked in graph database 690 in the same vertical, they enable powerful comparison and complementary product merchandising functions, and when sites and applications are linked from different verticals they enable powerful cross-marketing functions, even if they have no pre-existing relationships.

Once a site or app is categorized into the appropriate vertical, sub-vertical and product category using graph database 690, crawl engine 620 may spider all the variables in the site or app, and save them in universal variable map or variable database 530, with an index 615 using the index builder 625. The universal variable map may then be completed (step 301) by mapping the variables saved and indexed in variable database 530 to their normalized versions using a set of adaptive heuristics executed by the heuristics engine 540 or mapper 613. Advertisement platform 610 may be configured for the automatic generation of deep-linked ads (step 303) and the presentation of the deep-linked ads (step 305) by accessing variable mapping information and URL landing information in variable database 530.

Figure 7:
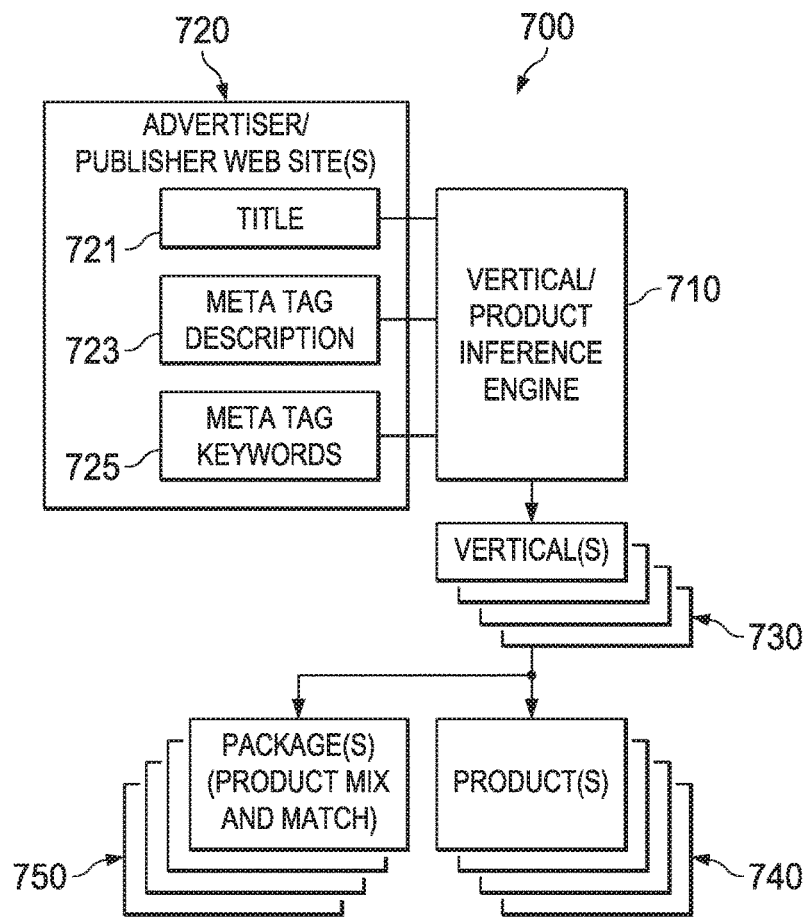
FIG. 7 depicts a diagrammatic representation of an example system architecture for decomposing a site into its component product and package offerings according to some embodiments disclosed herein.

FIG. 7 depicts a diagrammatic representation of an example embodiment utilizing keyword density of meta tags for selection of an appropriate vertical schema in the automated generation of deep-linked ads. All sites are categorized by verticals or geographies specified to the Ad system. As illustrated in FIG. 7, each vertical may comprise one or more sub-verticals, products 740 and/or one or more packages 750. Crawler or data gathering module 510 or Vertical/product inference engine 710 may be configured to cross-reference or otherwise associate a given site 720 with an appropriate vertical 730 by checking its meta tags 721, 723, 725. As an example, the meta tags for the site kayak.com may be as follows:

<title>Cheap Flights, Hotels, Airline Tickets, Cheap Tickets, Cheap Travel Deals—KAYAK—Compare Hundreds of Travel Sites At Once</title> <meta name="description" content="Find and book cheap flights, hotels, vacations and rental cars with Kayak.com. Hotel, flight and travel deals. Search hundreds of travel sites at once."/> <meta name="keywords" content="cheap airline tickets,airline tickets,airfare deals,cheap airfares,airfare,plane ticket prices,major airlines,discount airlines,online travel agencies, discount car rental,domestic airline tickets,international airline tickets,air travel,travel search,travel search engine, kayak"/>

In this example, it is clear that the keyword densities for Travel and Flights (Tickets) are the highest, identifying this is a Travel/Flights page and form.

Data flow 700 illustrates that, in some embodiments, meta tag(s) from web site(s) may be utilized by engine 710 in determining which web site belongs to which vertical or product category. An example variable schema for a Travel vertical/cluster of sites may be as follows:

Product Type
Flights|Hotel|Cars|Cruise|Vacation|Activities|Flights+Hotels|Flights+Cars|Hotels+Cars|Flights+Hotels+Cars
If Product Type=Flights
Itinerary Type Round Trip|One Way|Multiple Destinations

| From | Text |
|---|---|
| To | Text |
| DepartingDate | Date |
| DepartingTime | Time |
| ArrivingDate | Date |
| ArrivingTime | Time |
| Flex Dates | Yes|No |
| # Adults | Number |
| # Kids | Number |
| # Seniors | Number |
| Nonstop | Yes|No |

Additional example sites and their meta tags are provided below. Following the above example schema, notice that travel sites and non-travel sites have different descriptors. Embodiments of an engine can therefore readily determine what web site is in-cluster and what web site is out-of cluster for the vertical Travel.

Kayak.com
<title>Cheap Flights, Hotels, Airline Tickets, Cheap Tickets, Cheap Travel Deals—KAYAK—Compare Hundreds of Travel Sites At Once</title> <meta name="description" content="Find and book cheap flights, hotels, vacations and rental cars with Kayak.com. Hotel, flight and travel deals. Search hundreds of travel sites at once."/> <meta name="keywords" content="cheap airline tickets,airline tickets,airfare deals,cheap airfares,airfare,plane ticket prices,major airlines,discount airlines,online travel agencies, discount car rental,domestic airline tickets,international airline tickets,air travel,travel search,travel search engine, kayak"/>

Barnes and Noble
<title>Barnes&nbsp;&amp;&nbsp;Noble—Books, Textbooks, eBooks, Toys, Games & More</title> <meta name="description" content="New! Lower Prices on Millions of Books, DVDs, Music, Toys & Games and More. Shop for eBooks, NOOK, and textbooks. FREE Shipping on $25 orders!"/> <meta name="keywords" content="Holly Rose Tote Bag,Barefoot Contessa Cookbook,Ina Garten"/> <meta name="date" content="12/2/2010"/> <link rel="canonical" href="http://www.barnesandnoble.com/"/>

Tripmama
<title> Travel Deals, Compare Cheap Flights, Compare Cheap Airfares, Airline Tickets—TripMama </title> <meta name="resource-type" content="document"/> <meta http-equiv="pragma" content="no-cache"/> <meta id="MetaDescription" name="DESCRIPTION" content="Search and compare cheap flights and airline tickets on TripMama. Compare cheap airfares to popular destinations using three or more travel web sites"/> <meta id="MetaKeywords" name="KEYWORDS" content="compare airfare, compare cheap flights, travel deals, compare flights, cheap airfares"/>

Orbitz
<title>Orbitz Travel: Airline Tickets, Cheap Hotels, Car Rentals, Vacations & Cruises</title> <meta name="description" content="Book cheap airline tickets, hotel reservations, car rentals, vacations and travel deals on Orbitz. Get our cheapest airfare and hotel deals or a cash refund with Orbitz Price Assurance."/> <meta name="keywords" content="cheap airline tickets, cheap plane tickets, airline tickets, plane tickets, cheap tickets, cheap airfare, cheap hotels, cheap vacations, hotel reservations, car rentals, travel deals, flight deals, hotel deals, air travel, air tickets, air fares, airfare, travel"/>
    Kohls
    <title>Kohl's</title> <meta name="description" content="Expect Great Things when you shop Kohl's for apparel, shoes, accessories, home products and more! Find top brands at great prices at Kohl?s today!"/> <meta name="keywords" content="kohles, khols, khol, khol's, kholes, kohls', koles, kolhs, kohl stores, kohl store, kohl com, kohl department, kohl dept store, kohl department store, kohl department stores, khols department stores, khols stores, khols store, khol's store, khol store,"/>

Again, these meta tags can be used to determine to which vertical or category each web site belongs. In this way, once a site's category is defined, the variable mapping exercise can be simplified to match which variables or identifiers match up to which normalized variable, rather than a completely open-ended exercise of trying to map arbitrary strings of variable names to each other.

Figure 8:
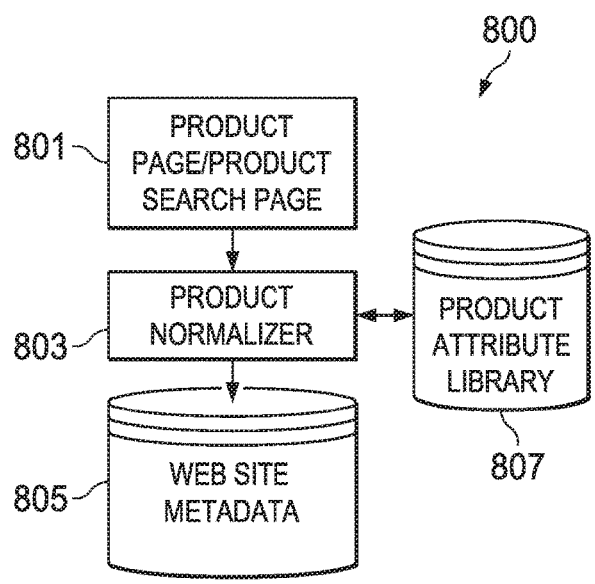
FIG. 8 depicts a diagrammatic representation of modules for searching a vertical or product and mapping variables, the modules accessing website schemas and product schemas.

FIG. 8 depicts a diagrammatic representation of an example embodiment of flow 800 for processing product information gleaned from web sites and mapping variables and fields for each of the products into normalized variables in the universal variable map. Flow 800 may utilize modules for searching a vertical or product and mapping variables, the modules accessing website schemas and product schemas. In this example, product page 801 embodies site 720 being spidered or obtained data for. Product normalizer 803 embodies crawl engine 620, persistence module 621, index builder 625 and graph builder 629. Product attribute library 807 embodies graph database 690. Website metadata 805 embodies variable database 530. Flow 800 will be further described below with reference to FIGS. 9 and 10.

Figure 9:
FIG. 9 depicts a diagrammatic representation of an example correspondence between a physical product, its product search form, its pertinent search variables, and the actual source code illustrating an example implementation.
Figure 10:
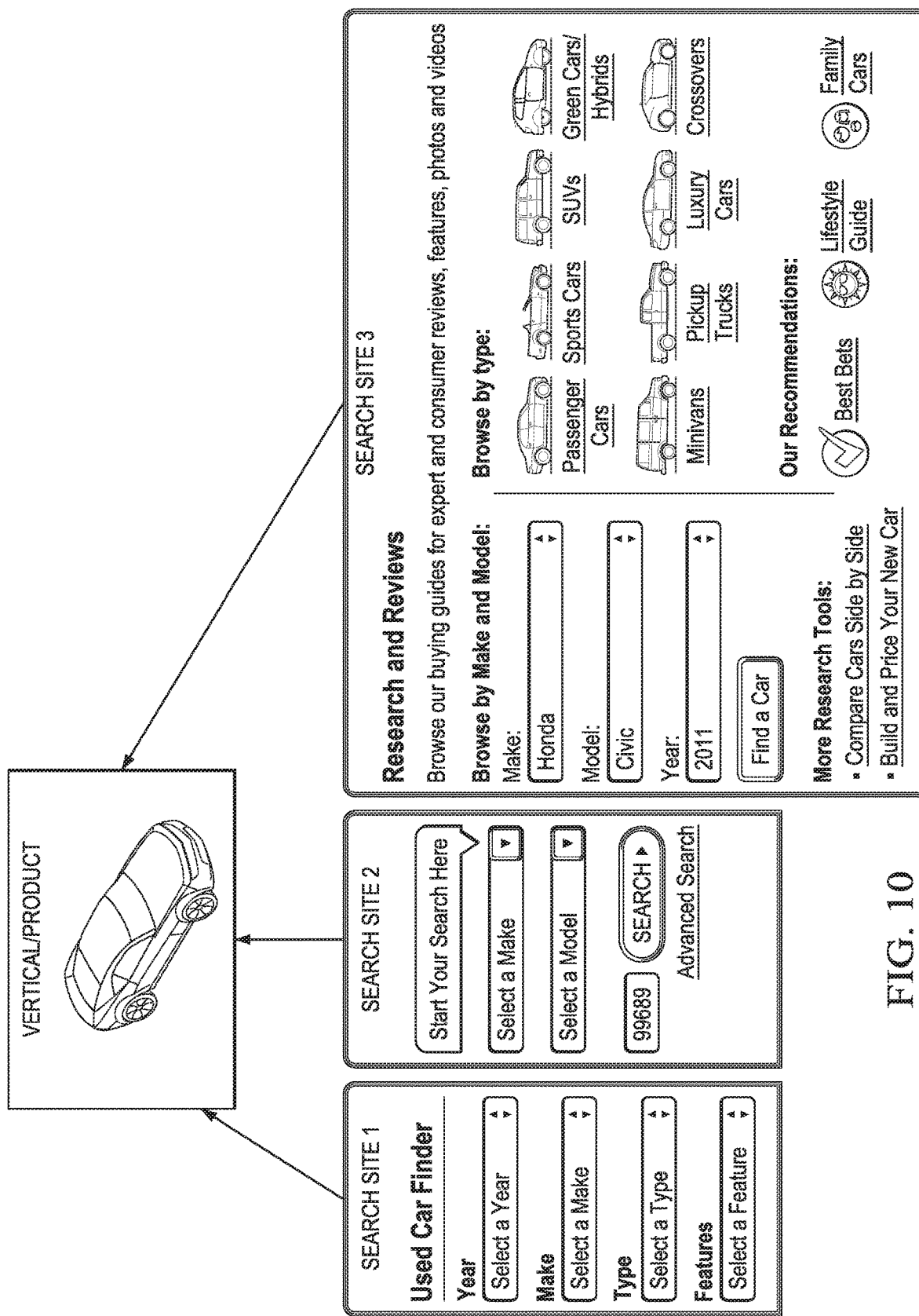
FIG. 10 depicts a diagrammatic representation of example linkages between a physical product, and the search fields on three different sites designed to search for that physical product, illustrating the logic behind the variable mapping exercise.

FIG. 9 exemplifies the relationship between a product 901 and a form 903 found by spidering module or data gathering module 510 on a site's product page or product search page (step 403 or step 801). Spidering module or data gathering module 510 may parse or scan form source code 913 to extract or otherwise obtain form data, including names of programming variables and identifiers associated with product attributes 911 such as "makeid", "modelid", and "year". Extracted product attributes 911 may then be normalized (step 405 or step 803) and persisted in universal variable map or variable database 530 or product attribute library 807 referring to website metadata data repository 805 or variable database 530. As illustrated in FIG. 10, the data gathering, normalizing, and persisting may be performed across a plurality of websites and apps on the Internet, including search sites and E-commerce sites, for each vertical or product of interest to the Ad system.

As described above, spidering module or data gathering module 510 may obtain and store these and other scanned names of programming variables and identifiers into a Normalized Variable Data database 530. This database may be considered a universal variable map of all classes and instances of products and services that can be searched and transacted on the Internet. Information stored on this universal variable map is archived for future reference. As an example, this database may store information such as the name of the generic variable for departure city in the above Travel example being "Orig," the name of this piece of information on arbitrary web site A being "SourceCity," and the name of this piece of information on arbitrary web site B being "StartLocation," for instance.

Figure 11A:
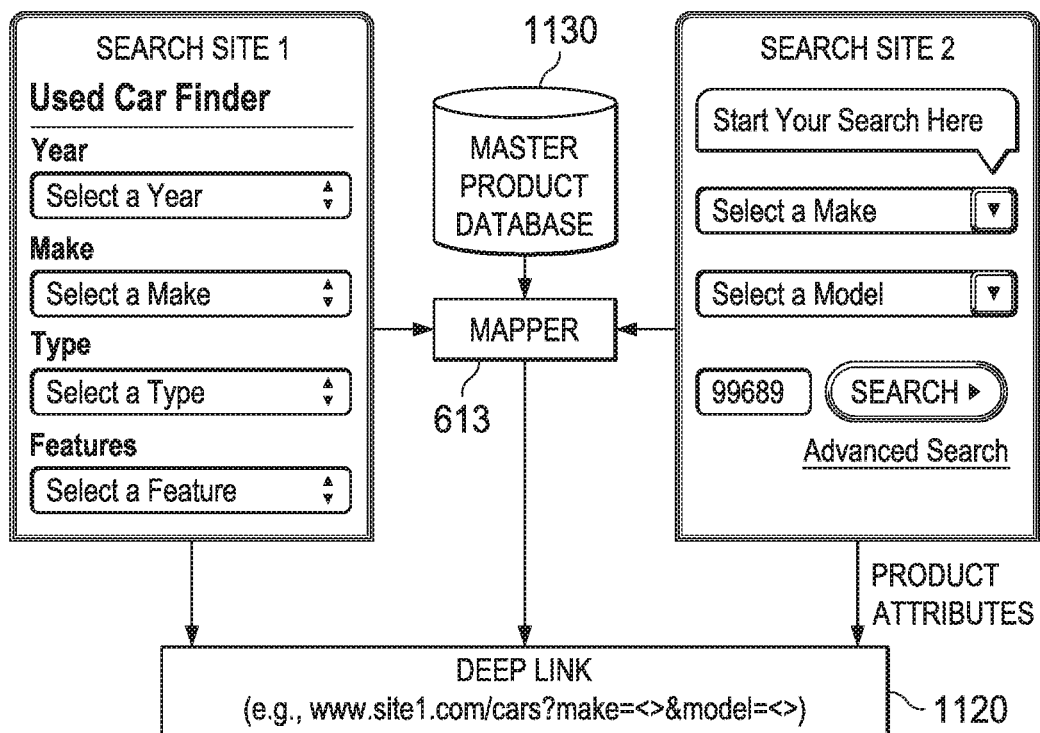
FIG. 11A depicts a diagrammatic representation of example linkages built in an automated fashion between two sites, where both sites have multiple search fields, and an illustration of an example generation of automated code for a deep-linking ad between the two sites.
Figure 11B:
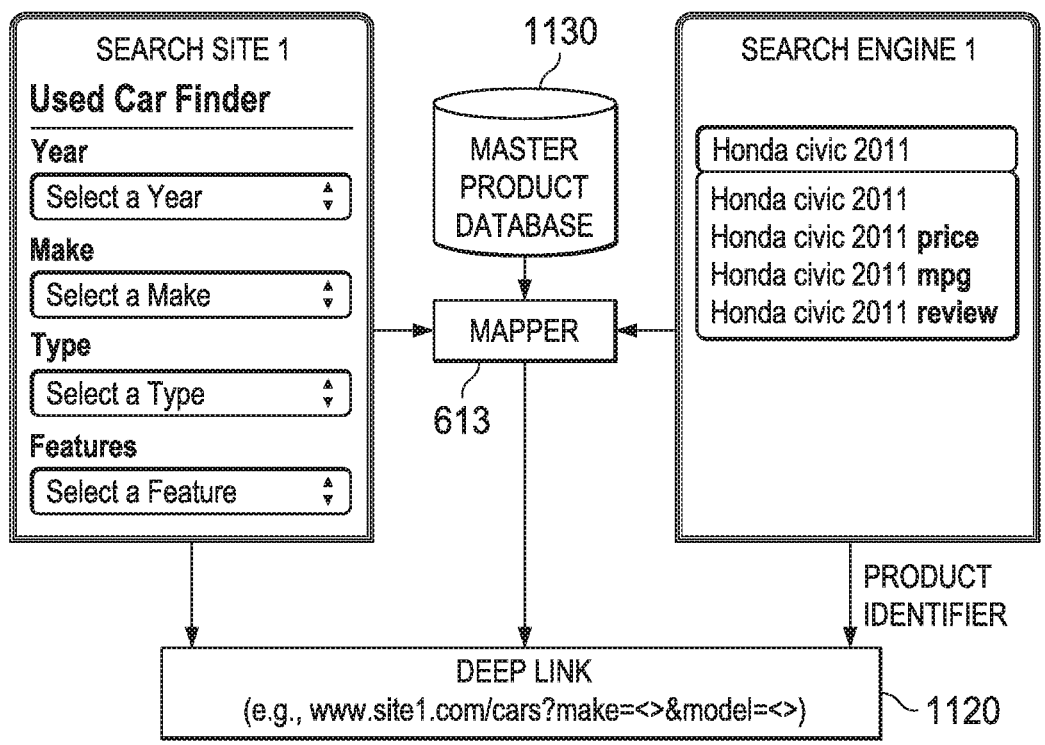
FIG. 11B depicts a diagrammatic representation of example linkages built in an automated fashion between two sites, where one site has multiple search fields and the other site has a composite text field, and an illustration of an example generation of automated code for a deep-linking ad between the two sites.

By creating this universal schema, if web site A wants to advertise a deep-linked ad for web site B, the Ad system would already know what the respective variable names were called, and could programmatically create an ad with accurate mappings without any human intervention. In one embodiment, this mapping function is performed by mapper 613. FIGS. 11A and 11B depict example implementations of mapper 613.

In the example of FIG. 11A, Search Site 2 is to provide to its visitors a deep-linked ad for Search Site 1. Mapper 613 may access universal variable map or variable database 530 or product attribute library 807 or master product database 1130 (which implements one embodiment of a universal variable map), cross reference programming variables used by Search Site 2 with those used by Search Site 1, and automatically create a deep-linked ad (deep link 1120 in this example). Deep link 1120 may then be placed on Search Site 2. When a user selects (either explicitly or implicitly) deep link 1120 on Search Site 2, the user's browser is automatically directed to a network address indicated by deep link 1120 ("www.site1.com/cars?make=< >&model=< >" in this example, where "make" and "model" represent mapped field identifiers). A form at the network address on Search Site 1 may be pre-populated with field identifier values (in this example, product attributes such as "Toyota" and "Prius"), along with any user input provided at Search Site 2. FIG. 11B shows an example in which a product identifier is passed along with deep link 1120 to Search Site 1.

Figure 12:
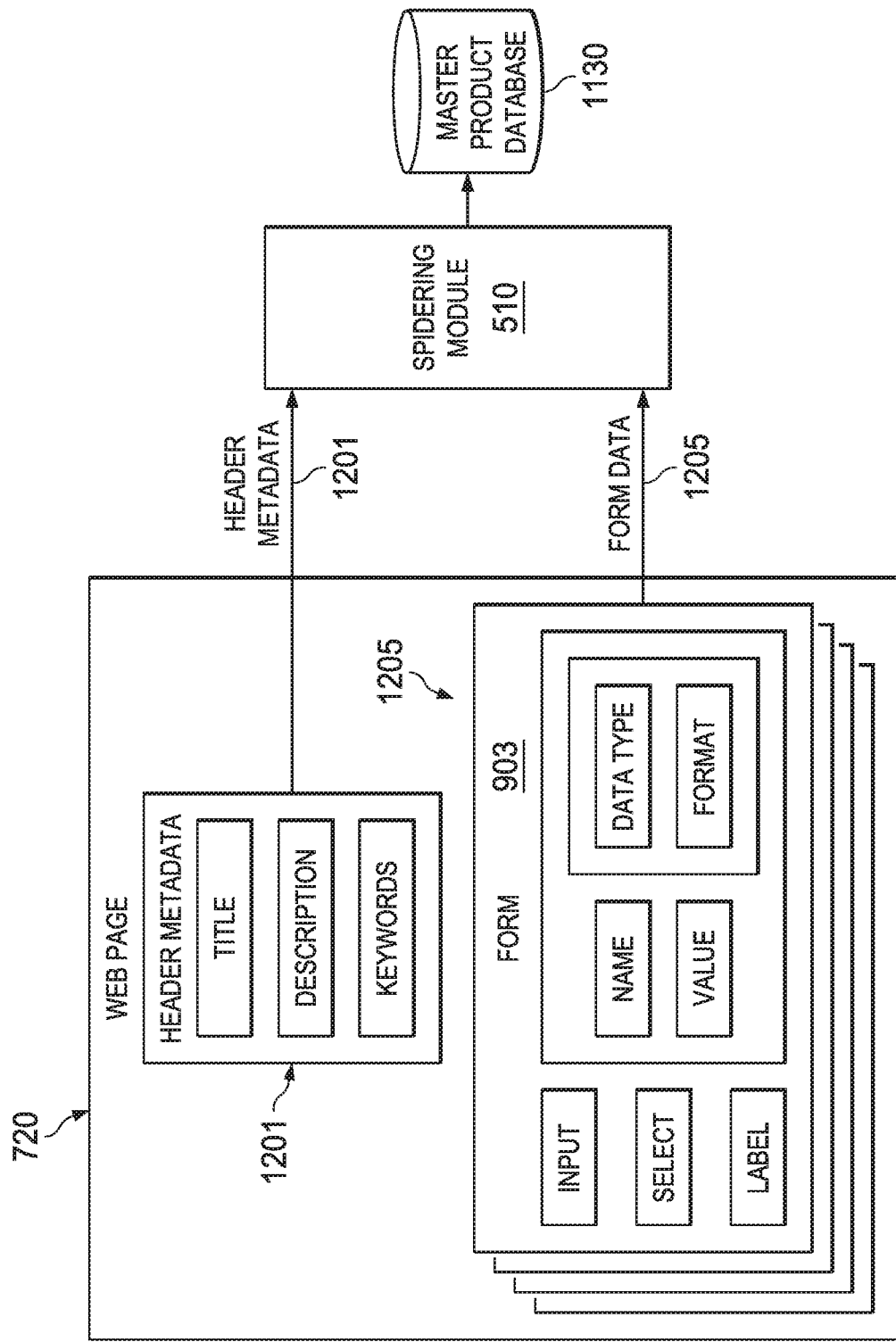
FIG. 12 depicts a diagrammatic representation of an example architecture for decomposing a web site or an app into its components, and eliciting, organizing and mapping its variables in the universal variable database.

In FIGS. 11A and 11B, both Search Site 1 and Search Site 2 belong to the same vertical. As FIG. 12 illustrates, information on a product and product attributes may be obtained by spidering module 510 from different sections of a web page. As an example, spidering module 510 may parse header metadata 1201, identify a vertical or product (utilizing a metadata keyword density method described above in one embodiment), and index the result. In one embodiment, data collected from header metadata 1201 may be stored in website metadata 805. Spidering module 510 may also parse form(s) 903 and form data 1205 associated therewith, identify a product associated with form(s) 903, obtain product attributes from form data 1205, and index the result. In one embodiment, data collected from form(s) 903 and form data 1205 may be stored in product attribute library 807. In one embodiment, vertical data and product data may be enhanced and stored in master product database 1130.

Figure 13:
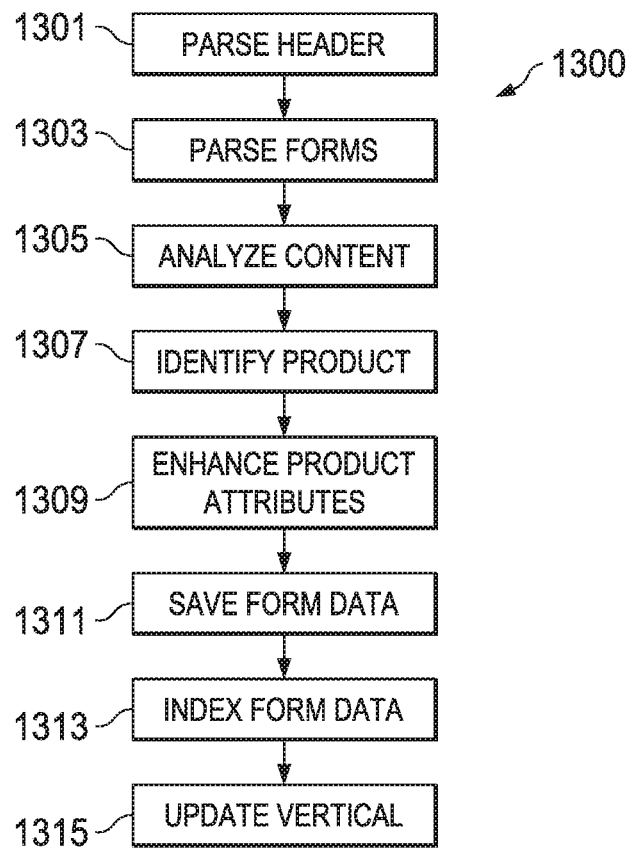
FIG. 13 depicts a diagrammatic representation of an example flow diagram for identifying, parsing, detecting, organizing and archiving site and applications and their product attributes or variables in the universal variable database.

Spidering module 510 can be implemented in various ways. FIG. 13 depicts a flow diagram illustrating an example embodiment of method 1300 for spidering across web sites. In this example, spidering module 510 may operate to parse a header section of a web page (step 1301), parse any forms on the page (step 1303), analyze content of the form(s) (step 1305), identify any product in the content of the form(s) (step 1307), enhance product attributes that can be identified (step 1309), persist the form data at the back end (step 1311), index the form data (step 1313), and update vertical data accordingly (step 1315).

By mapping all spidered variable names to a normalized set of variable names by vertical, embodiments disclosed herein can ensure that the Ad platform and database can scale by the order of magnitude of the number of sites and variables, as opposed to the square function of the number of sits and variables.

Referring to FIG. 5, in some embodiments, a Heuristics and Tuning Engine 540 can decide which variables on a site correspond to which normalized variable in the Normalized Database. In some embodiments, Heuristics and Tuning Engine or module 540 may comprise a series of heuristics.

In some embodiments, these heuristics may be developed by a combination of programmatic logic and human operators that progressively refines what the spider module infers about forms and schemas and variables. Non-limiting examples of heuristics (rules) may include:

Categorization. The first key heuristic, already discussed above, is to determine the Vertical and Product that a particular form pertains to, by searching for it on well-known search sites like Google and Bing, and by cross-checking its title meta-tags. Once a site's Vertical and Product category are known, the ad system can look up the schema in the Normalized Variable Database, and determine the finite set of variables that are of relevance to this form. This automatically constrains the set of variable choices to a finite list rather than a completely open-ended mapping process.

Sequence of fields. The second heuristic is the typical sequencing of fields on a form in a given Vertical. For instance, on a Travel form, the "From" or departure field typically precedes a "To" or arrival field. In this way, the spidering module can expect the first text fields to refer to the "From" field, and the second, the "To" field. Not by way of limitation, and purely for purposes of illustration, for Travel forms this heuristic can be assigned an initial weight of 40%.

Data types of fields. A second heuristic for determining mappings of variable fields is the data type of the field. For instance, a departure date might be specified to require a date data type, which enables the identification of the variable. Note that heuristics can be combined—for instance, there are only two fields in a Travel form that have a date field associated with them, the Departure Date and the Arrival Date, and the former precedes the latter. Not by way of limitation, and purely for purposes of illustration, for Travel forms this Data Type heuristic can be assigned an initial weight of 10%.

Partial word matches of text and variable names. This heuristic refers to the functionality to look up names of variables, and see if there is a partial word match from common variations of the field and variable name. For instance, when finding a departure field variable, partial matches can be done with the following common variations: "Fr", "Frm", "From", "Org", "Orig", "Origin", "Origination", "DCity", "DepCity", "DepartureCity", "Src", "Source", "SrcCity", "SourceCity". If there is a match the variable can be identified as matching the departure field. Not by way of limitation, and purely for purposes of illustration, for Travel forms this heuristic can be assigned an initial weight of 20%.

Field type—text, radio button, select. This heuristic helps to determine to which mapped variable a certain field maps. For instance, a Travel form can have radio buttons for a Round-trip itinerary, a One-way itinerary, or a Multiple destination itinerary. By knowing these fields to have radio buttons in the normalized schema, the ad system can conclude that these variables map to these entry fields. Similarly, a check box field can be concluded to be the "search nearby airports" field, or the "show non-stops only" field as the two check box fields on the form. Not by way of limitation, and purely for purposes of illustration, for Travel forms this heuristic can be assigned an initial weight of 15%.

Parsing comments for fields. This heuristic entails looking at the comments entries for Form code, and doing partial keyword matches with the comments string. For instance, when finding a departure field variable, partial matches can be done with the comments text strings and the following common variations: "Fr", "Frm", "From", "Org", "Orig", "Origin", "Origination", "DCity", "DepCity", "DepartureCity", "Src", "Source", "SrcCity", "SourceCity". Not by way of limitation, and purely for purposes of illustration, for Travel forms this heuristic can be assigned an initial weight of 5%.

Association patterns. This heuristic refers to creating associations between fields commonly found together on a form, and using that to map variables to one another. For instance, the check box "select nearby airports" is typically presented in association with a departure airport or an arrival airport. Not by way of limitation, and purely for purposes of illustration, for Travel forms this heuristic can be assigned an initial weight of 5%.

Proximity patterns. This heuristic refers to what form fields are typically presented close to what other form fields. For instance, in an Auto buying site, the "Make" field is typically presented next to the "Model" field. Not by way of limitation, and purely for purposes of illustration, for Travel forms this heuristic can be assigned an initial weight of 5%.

In some embodiments, the Heuristics and Tuning Engine may review results of the past spidering and categorization efforts and refine its logic, or add new heuristics, through a combination of programmatic adjustments and human operator adjustments. For example, for each vertical, a set of heuristics can be weighted (between 0% and 100%) to fine tune results such that a deep-linked ad can take a user directly, or substantially directly to a deeper page than the Home page of the advertiser. This optimization process can be based on, for example, a regression analysis and varying the weights via the analysis. This provides for a way for human operators to provide some of the schema rules, and for programming code to apply and enhance that schema logic for progressively more and more precise collection and mapping of variable names. For instance, in the above Travel form heuristics weights, the ad system can start with the above initial weights, make conclusions on the mappings of the appropriate variables, and conduct an action on the search box of the site, such as initiating a search with the variables as inferred by the initial heuristic weights. It can then examine the results of the action, and determine if the search proceeded as intended. If the search concluded successfully, no weighting adjustments are required, and if the search did not conclude successfully, then the system can adjust the heuristic weights and try the action again. In addition to the automated system-based adjustments of heuristic weights, from time to time human operators may spot trends in variable names, and create new heuristics to enable accurate mapping of variable names. Once such heuristics are created, and weight assigned, the system can again begin to run simulation tests with the new heuristics, and adjust weights adaptively.

In the spidering and mapping process, should a site be found with a form or field that is not already in the normalized universal variable database, then an embodiment of the invention is to add the new form or field to the universal variable map, thereby adapting and expanding the universal variable map to include all forms and fields and clicks and hovers found on the Internet.

Figure 14:
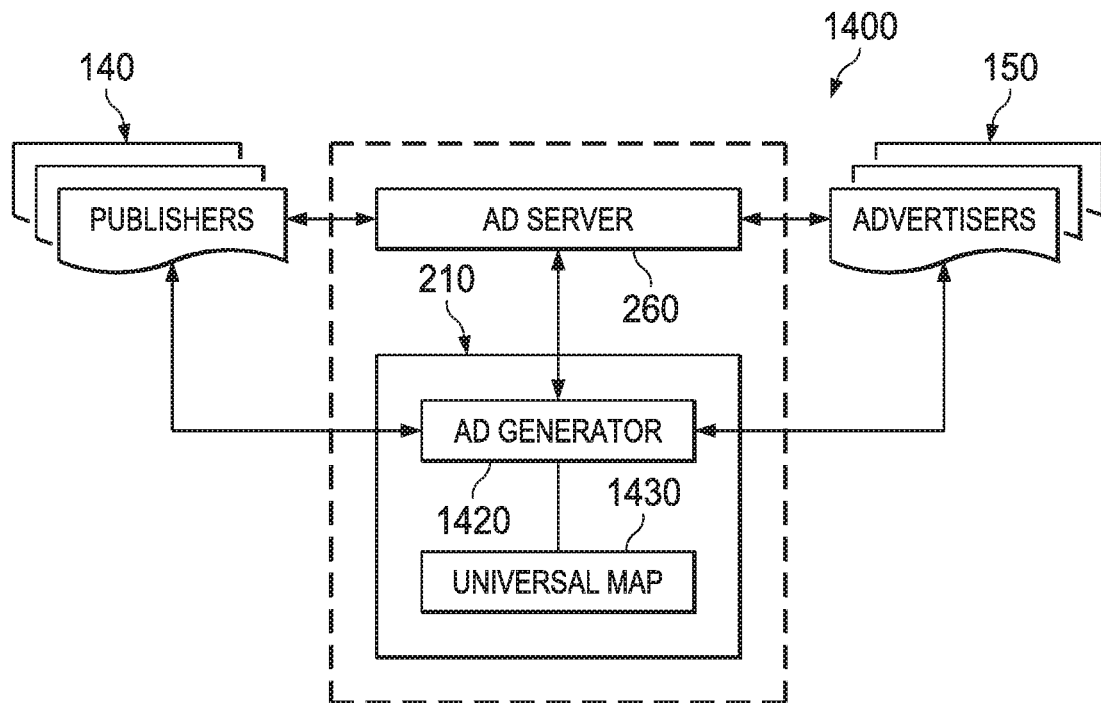
FIG. 14 depicts a diagrammatic representation of an example architecture for serving deep-linked ads via associations between an ad server, ad generator and universal variable map.

FIG. 14 depicts a diagrammatic representation of example system architecture 1400 according to some embodiments disclosed herein. In some embodiments, whenever a publisher (e.g., publisher 140) requests the insertion of a particular advertiser's (e.g., advertiser 150) deep-linked ad into its online media, or an advertiser requests placing its deep-linked ad on a publisher's media, an Ad Generator module 1420 may look up a pre-defined variable map, or create one from the stored variables (e.g., universal variable map 1430) in real-time, obtain other specified attributes of a deep-linked ad, such as target URL and creative specified, and insert a fully composed deep-linked ad into the designated ad server (e.g., ad server 260).

As illustrated in FIG. 14, if publisher web site 140 wants to place a deep-linked ad from advertiser web site 150, a request can be made to Ad system 210. Ad Generator module 1420 in Ad system 210 may look up the URL for advertiser web sites 150, look up the respective variable names in universal variable map 1430 (which, in one embodiment, implements Normalized Variable Data database 530), and automatically generate the deep-linked ad code that enables parameter-passing. In one embodiment, Ad Generator module 1420 may insert this code in ad server 260 in the appropriate location. These deep-linked ads can then be served live—either on web sites, or newsletters, or mobile apps that have ad serving capability. Once the deep-linked ads have been inserted into ad servers, they can be served up in real-time.

An embodiment of the invention includes the possibility that the ad is requested by the publisher web site 140 and the ad is served by the advertiser web site 150 not directly by publisher and advertiser clients, but via any form of agency or network or exchange or other third-party intermediary with access to publisher impressions or advertisers ads.

Figure 15:
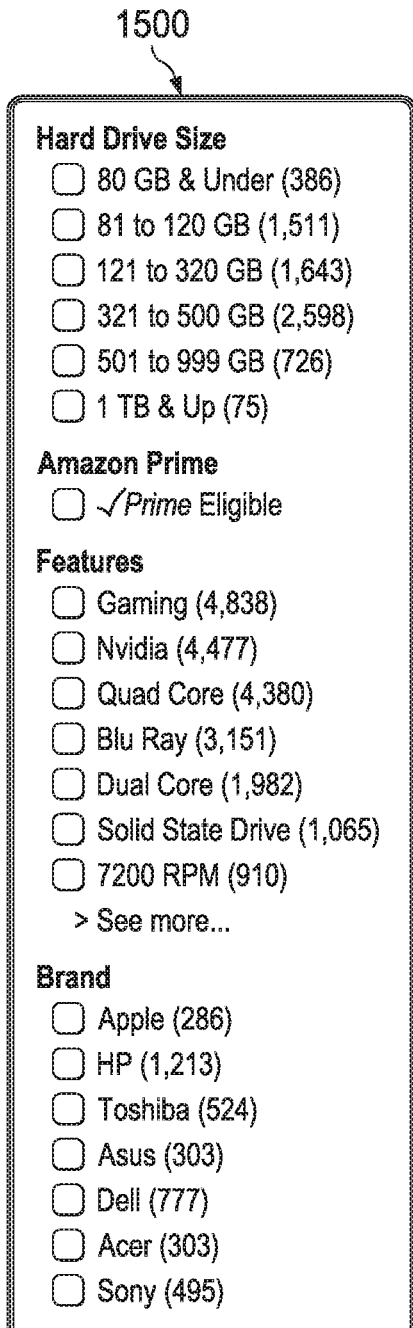
FIG. 15 depicts a diagrammatic representation of a web page/site that does not require any typed-in user input to operate, but rather is operated by clicking on or hovering over menu selections.

To an end user (e.g., a web site visitor), a deep-linked ad automatically generated via an embodiment disclosed herein may appear like a typical ad, a banner, an icon, an animated ad, a text ad, a check box, or anything of interest on a web site. For example, in FIG. 15, a portion of site 1500 is shown. In this example, "Hard Drive Size" and "Brand" represent variables for the vertical Electronics, sub-vertical Computers and product category Hard Drives, while "80 GB and Under" and "81 to 120 GB" represent possible values of the variable "Hard Drive Size". The user may click on the "80 GB and Under" selection, which would set the variable for "Hard Drive Size" on the publisher site, and through the mapping mechanism described above, on the advertiser site, to the value of "80 GB and Under". Similarly, the user may hover over "80 GB and Under" selection which may trigger the direct deep-linking, causing the user's browser to fetch and display a deep-linked page on the advertiser site. In one embodiment, a product may be identified from product attributes and/or parent elements of the selection being clicked or hovered over. The user's browser is therefore caused to fetch and display a deep-linked page for the product.

Hovering is one of many possible ways to obtain input data. As discussed above, embodiments disclosed herein provide a method for automatically spidering names of data input fields or variables on web pages. These data input fields or variables may be part of a form provided by a site. A user action may explicitly or implicitly set a variable or variables. Variations of linking data variables and fields may include a source form, a destination form, a single source to many destination form, many sources to one destination form, cascading forms (e.g., a first form links to a second form which links to a third form, etc.), and so on.

Explicitly, a user may be required to fill out a form at a certain site. For example, a travel site may require a user to fill out departure and arrival information for a vertical search, while a search engine may require the user to provide a text string which can be parsed out and linked to a vertical search site such as a particular travel site or to another search engine that can accept the parsed input.

Figure 16:
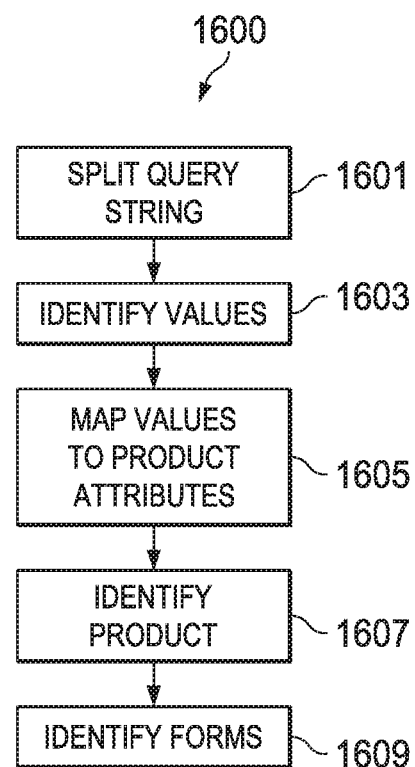
FIG. 16 depicts a diagrammatic representation of an example flow diagram for decomposing a composite text string into its component values and mapping the values onto multiple product attributes or variables.

FIG. 16 depicts a flow diagram illustrating one embodiment of example method 1600 for deep-linking. In this example, a user provided query string is parsed and split into words and phrases (step 1601). For example, a text string "flight rates from London to Amsterdam March 13" may be divided into "flight", "rates", "from", "London", "to", "Amsterdam", and "March 13". Words and/or phrases that may have value are identified (step 1603). In this example, "flight", "from London", "to Amsterdam", and "March 13" are determined to have value and are mapped to product attributes (step 1605). For example, "flight" is mapped to "air travel", "from London" is mapped to "departure city", "to Amsterdam" is mapped to "arrival city", and "March 13" is mapped to "departure date". In this case, "air travel", "departure city", "arrival city", and "departure date" are normalized product attributes (programming variables) in a universal variable map. Using these product attributes, a product can be identified (step 1607), which is "flight ticket for air travel" in this example. Using the product identifier, forms associated with this product can be identified (step 1609). Example forms may include "Expedia air search form, Orbitz air search form, American Airlines search form, Kayak air search form, etc. Although each site has its own programming variables, each of which is appropriately populated with values from the user's search query (i.e., the departure city, the arrival city, the departure date, etc.) utilizing the normalized product attributes in the universal variable map.

The above-described process can occur in real time such that, immediately after the user types in the text search query and causes the browser to submit a request for a result on the search query, the user's input can be parsed, decomposed into the pertinent values for the appropriate variables, linked to the corresponding variables on the advertiser's site, and land the ad click deep into the advertiser's site. In this way, the user's browser "fast forwards" from a horizontal search page to a deep vertical form page where the user can purchase a flight ticket to travel by air from London to Amsterdam on March 13.

In some cases, a user may not be required to type in information, but may be required to click or otherwise select an icon representing a target of interest (e.g., a product or service offered by or through the web site). In some cases, as discussed above, a user may simply hover over an ad and value(s) to certain variable(s) may be set accordingly. At run time, these values can be used to customize an ad copy, set other linked and mapped variables. Although a user clicking or hovering over site text or image is not an explicit data-entry action on the part of the user, contextual information provided by their implicit action can still be recognized and utilized by embodiments disclosed herein to customize and automatically generate deep-linked ads that can take the user directly to a checkout page with pre-populated values extracted from the user interaction. For instance, say a user is on the Amazon (www.amazon.com) web site. The user then selects the laptops section, and is on a page showing laptop selections by brand, product type, price range, etc. In this implementation, the ad system can scan and read in the tags on this page on the Amazon web site. Now when the user clicks on a selection on the Amazon laptops page, the appropriate variables can be set—for instance, Vertical can be set to Electronics, the Product to Laptops, and the brand to Dell, price to Under $2000, etc. Then on the results page for those selections, deep-linked ads can be presented with the appropriate variable values set.

In another embodiment, the user might only hover over the Dell laptop selection on the Amazon site, and the ad system can detect the product or attribute hovered over, and present deep-linked ads with all known variables set.

In embodiments disclosed herein, deep-linked ads between any two arbitrary web sites or mobile apps and other deployment scenarios can be created. Those skilled in the art will appreciate that embodiments disclosed herein can be adapted for various ad types, including, but are not limited to, text, graphics, animations, videos, audios, etc. For example, in one embodiment, a deep-linked handshake can be inserted into a video showing a product or service. In this case, no user action is involved. Rather, the linkage insertion is based on ad selection which is based on content being displayed or played to the user. For instance, the user may be watching a movie with an actor using an iPhone 4G. The movie may embed data tagging synchronized with the video, whereby certain product identifications can be made available to the ad system. Knowledge of the product in use can then be used to set the appropriate variables, such as Vertical can be set to Electronics, Product can be set to Smart Phones, Model can be set to iPhone 4G, etc. A deep-linked ad presented at this point can be precisely targeted to an iPhone 4G available for purchase in the geographic vicinity, and clicking on the ad might take the user directly to the iPhone 4G checkout page on the advertising site.

Some embodiments disclosed herein provide a method for creating cascades or chains of such deep-linked ads such that an arbitrary number of ad linkages can be set up, whereby an advertiser receiving a click can turn around and become a publisher for the next deep-linked ad click sent to another advertiser on that site. Embodiments disclosed herein thus automate a new generation of ads on the Internet and mobile devices that have not been possible before without extensive human intervention and programming.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment," or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, or the like. Optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
    generating, by a server computer, a deep-linked ad utilizing a universal variable map stored in a data store and accessible by the server computer, the universal variable map linking programming variables across multiple sites on the Internet and applications;
    serving, by the server computer, the deep-linked ad through a first site or mobile application, the deep-linked ad linking a first set of programming variables of the first site on the Internet or the first mobile applications with a second set of programming variables of a second site on the Internet or a second mobile application, the first set of programming variables being associated with the second set of programming variables in the universal variable map stored in the data store; and
    in response to a user interacting with the deep-linked ad displayed on a user device through an instance of the first site on the Internet or the first mobile application:
        extracting, through the first site on the Internet or the first mobile application, values corresponding to the first set of programming variables;
        automatically directing the user device to the second site on the Internet or the second mobile application; and
        passing the values corresponding to the first set of programming variables to the second set of programming variables such that one or more fields corresponding to the second set of programming variables of the second site on the Internet or the second mobile application are explicitly or implicitly pre-populated with the values extracted through the first site on the Internet or the first mobile application.

2. The method according to claim 1, wherein serving the deep-linked ad comprises inserting the deep-linked ad into a video on the first site on the Internet or in the first mobile application, the video showing a product or service.

3. The method according to claim 2, wherein the deep-linked ad is selected based on content being displayed or played to the user through the first site on the Internet or the first mobile application.

4. The method according to claim 1, wherein serving the deep-linked ad comprises fetching and displaying a deep-linked page, the deep-linked page having information for a product or service.

5. The method according to claim 4, wherein the first set of programming variables comprises a programming variable associated with the product or the service and wherein the second set of programming variables comprises a programming variable associated with an attribute or element of the product or the service.

6. The method according to claim 1, wherein the second site on the Internet comprises a second deep-linked ad that utilizes the universal variable map stored in the data store and wherein the second deep-linked ad links the second set of programming variables of the second site on the Internet with a third set of programming variables of a third site on the Internet or a third mobile application, the second set of programming variables being associated with the third set of programming variables in the universal variable map stored in the data store.

7. The method according to claim 6, wherein interaction between an end user and the second deep-linked ad on the second site on the Internet, through a browser running on a computing device of the end user, directs the browser to the third site on the Internet or to the third mobile application and passes values corresponding to the second set of programming variables to the third set of programming variables such that one or more fields corresponding to the third set of programming variables of the third site on the Internet or the third mobile application are explicitly or implicitly pre-populated with the values passed from the first site on the Internet or the first mobile application through the second site on the Internet to the third site on the Internet or the third mobile application.

8. The method according to claim 1, wherein the second mobile application comprises a second deep-linked ad that utilizes the universal variable map stored in the data store and wherein the second deep-linked ad links the second set of programming variables of the second mobile application with a third set of programming variables of a third site on the Internet or a third mobile application, the second set of programming variables being associated with the third set of programming variables in the universal variable map stored in the data store.

9. The method according to claim 8, wherein interaction between an end user and the second deep-linked ad in the second mobile application on a computing device of the end user directs the computing device to the third site on the Internet or to the third mobile application and passes values corresponding to the second set of programming variables to the third set of programming variables such that one or more fields corresponding to the third set of programming variables of the third site on the Internet or the third mobile application are explicitly or implicitly pre-populated with the values passed from the first site on the Internet or the first mobile application through the second mobile application to the third site on the Internet or the third mobile application.

10. The method according to claim 1, wherein the deep-linked ad comprises at least one of a page, a banner, an icon, an animated ad, a text-based ad, or a check box.

* * * * *